US010296574B2

(12) United States Patent
Smith et al.

(10) Patent No.: US 10,296,574 B2
(45) Date of Patent: May 21, 2019

(54) CONTEXTUAL INK ANNOTATION IN A MAPPING INTERFACE

(71) Applicant: Microsoft Technology Licensing, LLC, Redmond, WA (US)

(72) Inventors: Douglas Smith, Renton, WA (US); Chad Estes, Woodinville, WA (US); Kshitij Sethi, Bellevue, WA (US); Felix Andrew, Seattle, WA (US); Jeff West, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 178 days.

(21) Appl. No.: 15/141,648

(22) Filed: Apr. 28, 2016

(65) Prior Publication Data

US 2017/0277670 A1    Sep. 28, 2017

Related U.S. Application Data

(60) Provisional application No. 62/314,308, filed on Mar. 28, 2016.

(51) Int. Cl.
G06F 17/24 (2006.01)
G06F 3/0488 (2013.01)
(Continued)

(52) U.S. Cl.
CPC ........ G06F 17/241 (2013.01); G06F 3/04845 (2013.01); G06F 3/04883 (2013.01);
(Continued)

(58) Field of Classification Search
CPC ............... G06F 17/241; G06F 17/242; G06F 17/30241; G06F 3/04883
See application file for complete search history.

(56) References Cited

U.S. PATENT DOCUMENTS 6,980,202 B2    12/2005  Carro
7,076,409 B2     7/2006  Agrawala et al.
(Continued)

OTHER PUBLICATIONS

ISA European Patent Office, International Search Report and Written Opinion Issued in PCT Application No. PCT/US2017/023498, dated May 31, 2017, WIPO, 11 Pages.
(Continued)

Primary Examiner — Scott T Baderman
Assistant Examiner — Seung Woon Jung
(74) Attorney, Agent, or Firm — Alleman Hall Creasman & Tuttle, LLP

(57) ABSTRACT

A computing device and method for use in enabling contextual ink annotation in a mapping interface are disclosed. In one aspect, the computing method may include receiving a map view request to render a map view of map data based upon a current map rendering context, determining that a previously created virtual ink annotation is associated with a location within the map view, the virtual ink annotation having a previous map rendering context captured at a time of creation of the virtual ink annotation, and comparing the current map rendering context to the previous map rendering context associated with the virtual ink annotation. The method may further include, based on a result of the comparison, controlling display of the virtual ink annotation in a rendered map view.

15 Claims, 7 Drawing Sheets

(51) Int. Cl.
  *G06T 15/00* (2011.01)
  *G09B 29/00* (2006.01)
  *G06F 3/0484* (2013.01)
  *G06F 16/29* (2019.01)

(52) U.S. Cl.
  CPC ............ *G06F 16/29* (2019.01); *G06F 17/242* (2013.01); *G06T 15/005* (2013.01); *G09B 29/007* (2013.01); *G06F 2203/04806* (2013.01)

(56) References Cited

U.S. PATENT DOCUMENTS

| | | | |
|---|---|---|---|
| 7,574,048 | B2 | 8/2009 | Shilman et al. |
| 8,700,987 | B2 | 4/2014 | Spalink |
| 9,214,043 | B2 | 12/2015 | Beaurepaire |
| 2010/0023259 | A1 | 1/2010 | Krumm et al. |
| 2011/0214047 | A1* | 9/2011 | Pilskalns ........... G06F 17/30241 715/205 |
| 2011/0320114 | A1 | 12/2011 | Buxton et al. |
| 2012/0254718 | A1 | 10/2012 | Nayar et al. |
| 2014/0280180 | A1* | 9/2014 | Edecker ............ G06F 17/30598 707/740 |
| 2015/0339050 | A1 | 11/2015 | Vong |
| 2016/0313957 | A1* | 10/2016 | Ebert ........................ G06F 3/14 |

OTHER PUBLICATIONS

"Commands on the Tablet toolbar", Retrieved on: Mar. 12, 2016 Available at: http://desktop.arcgis.com/en/arcmap/10.3/map/add-ink-to-a-map/commands-on-the-tablet-toolbar.htm.

Duvander, Adam, "How to Scribble and Share Customized Google Maps", Published on: Jan. 27, 2010 Available at: http://www.programmableweb.com/news/how-to-scribble-and-share-customized-google-maps/2010/01/27.

Willems, et al., "Pen gestures in online map and photograph annotation tasks", In Proceedings of Tenth International Workshop on Frontiers in Handwriting Recognition, Oct. 2006, 7 pages.

Agrawala, et al., "DIZI: A Digital Ink Zooming Interface for Document Annotation", In Proceedings of Tenth IFIP TC13 International Conference on Human-Computer Interaction, Sep. 12, 2005, 13 pages.

\* cited by examiner

T1

T2

CONTEXTUAL INK ANNOTATION IN A MAPPING INTERFACE

CROSS REFERENCE TO RELATED APPLICATIONS

This application claims priority to U.S. patent application Ser. No. 62/314,308 entitled "CONTEXTUAL INK ANNOTATION IN A MAPPING INTERFACE", filed Mar. 28, 2016, the entirety of which is hereby incorporated herein by reference.

BACKGROUND

Mapping programs are used in a wide variety of computing devices. For instance, mobile devices typically include mapping and navigation programs providing the user with maps, directions, points of interest, etc. Mapping programs offer convenience over paper maps because they can dynamically render views of map data, from a point of view and at a level of detail chosen by the user.

In addition, recently tablets and other touch sensitive computing devices have been designed to receive ink inputs from styluses interacting with touchscreens or other input devices to add notes or otherwise mark-up media content. For example, a user may grip a stylus, contact a touchscreen with the stylus, and make writing motions. A software program, such as an application programming interface of an operating system, may capture the motion of the stylus, group the motions of the stylus into groups of strokes, and store the result as virtual ink. The virtual ink may be rendered on the touchscreen beneath the stylus as the user is moving the stylus, thereby giving the look and feel of natural writing. Further, the stored ink may be recalled and displayed at a later time. In other examples, a finger or mouse may be used instead of a stylus to write virtual ink.

While virtual ink offers the look, feel, and convenience of a natural writing motion, most application programs designed to handle virtual ink inputs offer static writing surfaces, such as an electronic notepad, whiteboard, etc. Programs that dynamically render views of data, such as mapping programs, are not equipped to adequately handle virtual ink. As a result, users wanting to annotate maps using virtual ink in such mapping programs may find themselves frustrated.

SUMMARY

A computing device and method for use in enabling contextual ink annotation in a mapping interface are disclosed. In one aspect, the computing method may include receiving a map view request to render a map view of map data based upon a current map rendering context, determining that a previously created virtual ink annotation is associated with a location within the map view, the virtual ink annotation having a previous map rendering context captured at a time of creation of the virtual ink annotation, and comparing the current map rendering context to the previous map rendering context associated with the virtual ink annotation. The method may further include, based on a result of the comparison, controlling display of the virtual ink annotation in a rendered map view.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A computing device for use in generating an interactive mapping interface with contextualized ink annotations is described herein. The computing device actively links virtual ink annotations to map rendering contexts of the interactive mapping interface. The map rendering contexts are characterized by contextual parameters such as zoom level, map type, central geographical location, navigation route, navigation marker, emphasized object and sets of emphasized objects, etc. The links established between ink annotations and map rendering contexts enables graphical state of virtual ink annotations to be altered when the contextual parameters in in the map rendering contexts are adjusted. For instance, a virtual ink annotation may be tied to a range of zoom levels of the interactive mapping interface. When the zoom level is moved outside the zoom level range presentation of the virtual ink annotation may be suspended. Thus, extraneous presentation of virtual ink annotations in map views where they were not intended to be displayed can be avoided. For instance, a user may want a virtual ink annotation to be associated with a city or state and not associated with an entire country or continent. Thus, the virtual ink annotation may only be displayed when the geographical boundary in the mapping interface encompasses the city or state and is not displayed when the geographical boundary encompasses the country or continent in which the city or state is located. In yet another example, an ink annotation may be linked to a brick and mortar business presented in an interactive mapping interface. When the brick and mortar business decreases in size due to a zoom level adjustment the opacity and/or size of the virtual ink annotation may be decreased. In this way, a user can mark-up an interactive mapping interface with ink annotations that are synchronized with the context of the underlying content. As a result, the mapping interface can be enhanced with relevant notational content.

Figure 1:
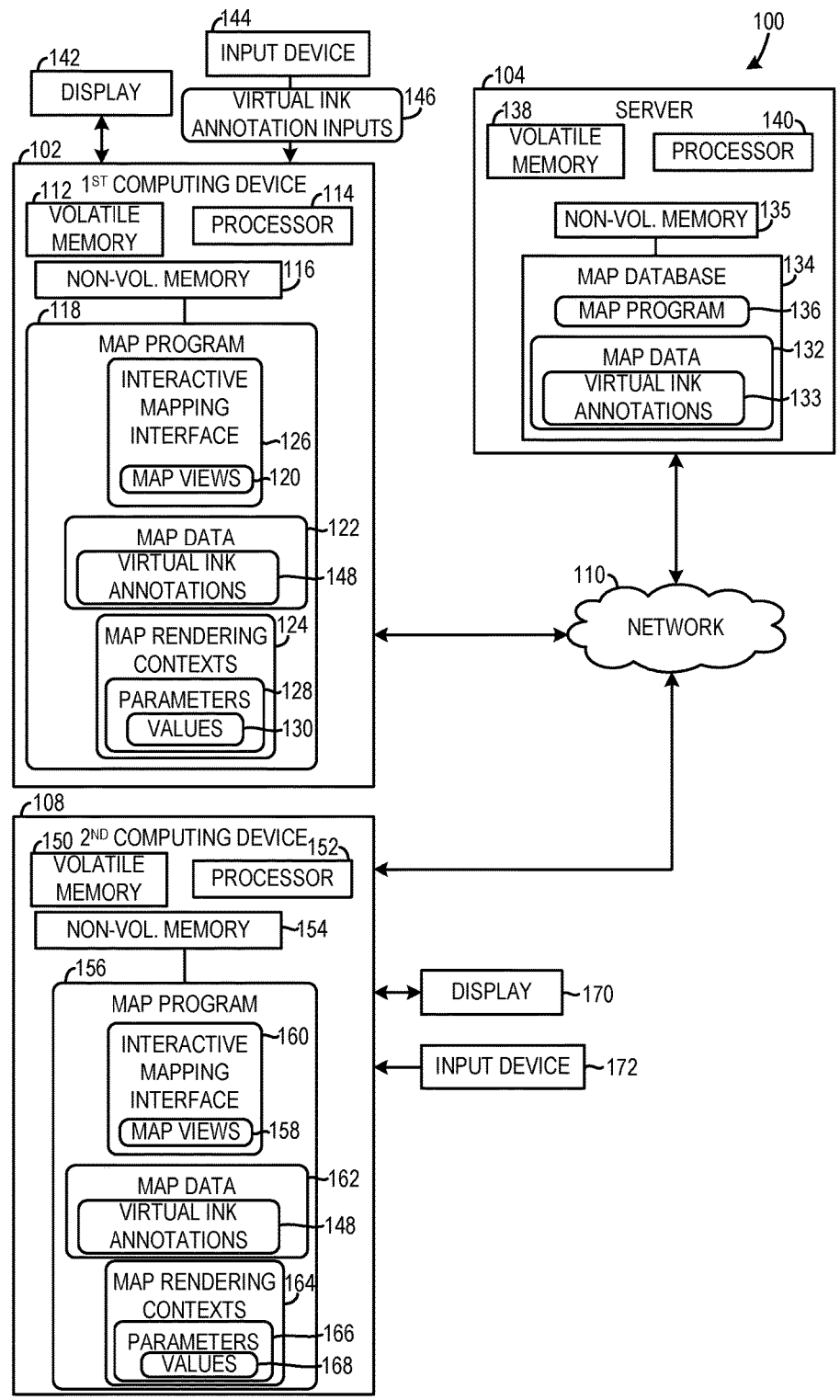
FIG. 1 is a schematic view of a computing system according to one embodiment of the present disclosure, which includes a plurality of computing devices, each configured to display a mapping interface with contextual ink annotation functionality.

FIG. 1 depicts a computing system 100 including a first computing device 102, a server 104, and a second computing device 108 electronically communicating via a network 110 (e.g., the Internet, a wide area network, local area network, etc.)

The first computing device 102 includes volatile memory 112 and a processor 114. It will be appreciated that the methods described herein may be implemented as code stored in the volatile memory 112 executable by the processor 114.

The first computing device 102 also includes non-volatile memory 116 (e.g., solid state drive, disk drive, optical drive, etc.) A map program 118 may be stored in the non-volatile memory 116. The map program 118 is configured to render different map views 120 of map data 122 based upon map rendering contexts 124, each of which are stored in the map program 118. The map views 120 of the map data 122 may be presented in an interactive mapping interface 126 generated by the map program 118.

The map data 122 may include presentation data such as templates, backgrounds, surface patterns, etc., and data related to geographical features such as objects, regions, landforms, etc. Additionally, each of the map rendering contexts 124 has at least one associated parameter. Thus, the map rendering contexts 124 include a plurality of parameters 128. The parameters may be a zoom level, map type, central geographical location, emphasized object or set of objects, navigation route, navigation marker, etc.

Each of the parameters 128 has a value (e.g., numerical value, string, type, etc.) and therefore the parameters 128 have a plurality of values 130. For instance, the value of a zoom level can be a numerical value. In such an example, the value of the zoom level may be a value within a zoom scale having a plurality of discrete zoom level values. For instance, a zoom level value may be any integer between 1 and 20. However in other examples, the zoom level may have non-discrete values. Additionally, a value of the map type can be a satellite map, road map, terrain map, hybrid map, street view map, etc. Furthermore, a value of the geographical location can be a location identifier (e.g., a set of coordinates such as latitude and longitude). In the case of the emphasized object parameter, a value of an emphasized object can be a string identifying the object or a location identifier associated with the object. Additionally, a value of a navigation route may be a set of points (e.g., coordinates) defining the path of the route. In the case of a navigation maker parameter, a value of a navigation marker may be a location identifier (e.g., coordinates) defining the position of the marker.

The map data 122 may be sent to the first computing device 102 from the server 104 which stores corresponding map data 132 in a map database 134. The map database 134 is contained in non-volatile memory 135 within the server 104. For instance, the map program 118 on the first computing device 102 may request map data from the server 104. In response, the server 104 sends map data to the first computing device 102. The server 104 may also include an instance 136 of the map program 118, in the first computing device 102, stored in the map database 134. The server 104 also includes volatile memory 138 and a processor 140 for executing instructions in the map database 134. The server 104 can also include virtual ink annotations 133 stored in the map database 134. Additionally, the virtual ink annotations 133 may be synced with virtual ink annotations 148 stored in the first computing device 102.

The interactive mapping interface 126 in the first computing device 102 may be sent to a display 142 for presentation. Additionally, the user can input virtual ink annotations and other data into the first computing device 102 via an input device 144. The input device 144 may be a touch screen configured to interact with a stylus or finger, a mouse, a track pad, etc. Further in one example, the display may be configured as a touch sensitive display and generate virtual ink annotation inputs responsive to touch or stylus interaction. In such an example, the virtual ink annotations may only generated in response to stylus and touch interaction with the touch screen and may be rendered beneath the touch or stylus strokes to give the look and feel of natural writing. Although the display 142, input device 144, and first computing device 102 are depicted as separate components in FIG. 1, the display 142 and/or input device 144 may be integrated into the first computing device 102.

Virtual ink annotation inputs 146 are sent from the input device 144 to map program 118 in the first computing device 102. The virtual ink annotation inputs 146 may be assigned on a user by user basis and/or on a device by device basis, in some examples. In this way, ink inputs from different users can be identified and used in collaborative inking scenarios. After the inputs are received, virtual ink annotations 148 are stored in the map data 122. Additionally, responsive to receiving the input of virtual ink annotations the map program 118 is configured to associate the current map rendering context with the virtual ink annotations 148.

The map program 118 is configured to compare different map rendering contexts. For instance, values of selected parameters of the map rendering contexts 124 may be compared with one another to determine if a value of one parameter matches within a range a value of another parameter.

When the compared parameters are zoom levels, the range may be a numerical deviation from the first or second zoom level value, such as ±2. In such an example, a first zoom level may have a value of 3 and a second zoom level may have a value of 5. Therefore, the zoom level value of 3 matches within the range (i.e., ±2) the zoom level value of 5. However, a zoom level with a value of 6 does not match within the range (i.e., ±2) a zoom level with a value of 3. In another example, the comparative parameters may be map types. In this example, a matching range may be a set of map type values such as a set including "satellite map" and "terrain map". Therefore, when the value of a first parameter is a "satellite map" and the value of a second parameter is "terrain map" which is one type of satellite map, then the values may be found to match within the range. However, when the value of a first parameter is "satellite map" and the value of the second parameter is "street view map", the values may be determined not to match within the range, because a street view map is not one type of satellite map. Simply put, matching within a range could be performed by determining whether a given object matches one of a plurality of target objects in a set, or is a similar type of object to the target object, for non-numerical parameter values.

In an additional example, the comparative parameters may be central geographical locations. In one specific example, the matching range may be a predetermined radius around a first central geographical location. When the second central geographical location is positioned within the circle defined by the radius the central geographical locations match. However, if the second central geographical location is not positioned within the circle defined by the radius the central geographical locations do not match. Of course, other shapes besides circles may be used, and indeed, other techniques may be used to determine whether two geographic locations match within a range.

In another example, the map program 118 may be configured to compare selected parameter values of map rendering contexts to determine if the values match within nested ranges. For instance, if the values match within a first range the values may be again compared to determine if they match within a narrower range. One detailed example of such nested ranges is discussed below with relation to FIG. 9.

The map program 118 may be configured to control the display of virtual ink annotations based on the comparison of different map rendering contexts and specifically the matching of the parameter values of the map rendering contexts. Controlling display of virtual ink annotations may include displaying virtual ink annotations or refraining from displaying virtual ink annotations. For example, when the values of parameters of different map rendering contexts match, a virtual ink annotation may be displayed in the map views rendered based on the different map rendering contexts. However, when the values of parameters of different map rendering contexts do not match, a virtual ink annotation may not be displayed in some of the map views. Additionally, controlling display of virtual ink annotations may include adjusting the graphical state (e.g., visibility, size, orientation, opacity, etc.,) of virtual ink annotations 148 in different map views based on the aforementioned comparison. For instance, the opacity, size, and/or orientation of the virtual ink annotation may be adjusted in the different map views based on the matched parameter values. Moreover, when the map program 118 determines if selected values match within nested ranges the program may adjust a graphical state (e.g., size, opacity, and/or orientation) of the virtual ink annotation if the values match within a first range but not within a second range contained within the first range, as discussed in detail with relation to FIG. 9 below.

The first computing device 102 is also configured to send virtual ink annotations 148 to the second computing device 108. The second computing device 108 includes volatile memory 150, a processor 152, and non-volatile memory 154. The second computing device 108 also has an associated display 170 and input device 172 having similar functionality to the display 142 and the input device 144 associated with the first computing device 102.

In the second computing device 108 an instance 156 of the map program 118, in the first computing device 102, may be stored in the non-volatile memory 154. The instance 156 of the map program in the second computing device 108 can have similar functionality to the map program 118 in the first computing device 102. Thus, the instance 156 of the map program in the second computing device 108 includes map views 158 in an interactive mapping interface 160. The map views 158 are views of map data 162 rendered based on map rendering contexts 164 including parameters 166 having various values 168. The map views 158 can also include the virtual ink annotations 148 sent from the first computing device 102 as well as locally generated virtual ink annotations. In this way, virtual ink annotations can be shared between the first computing device 102 and the second computing device 108. For instance, users can collaboratively ink a common interactive mapping interface, such as a map related to a forthcoming vacation, business trip, group bicycle ride or run, etc., to expand the interactive mapping interfaces collaborative capabilities.

Figure 2:
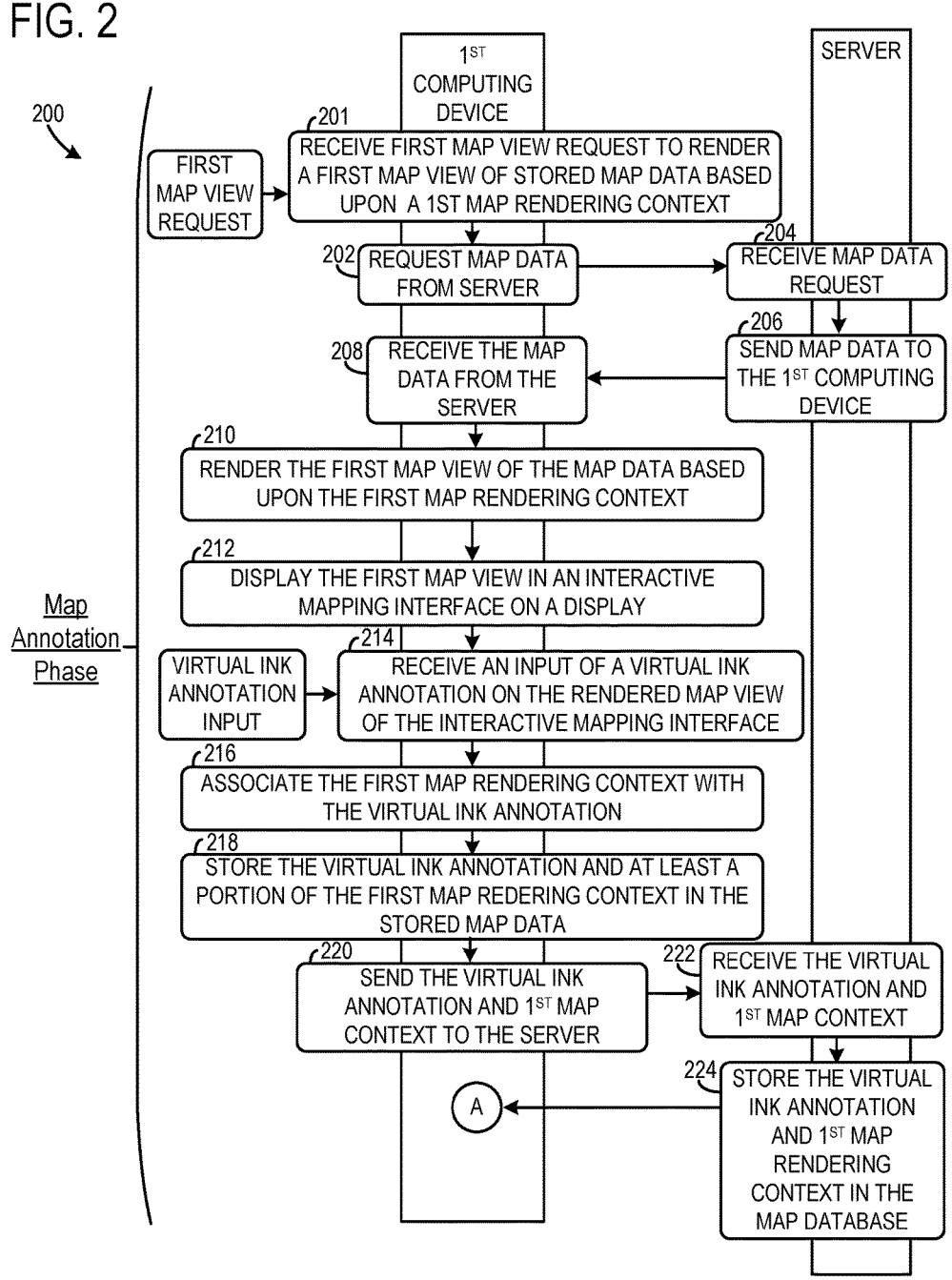
FIG. 2 is a flowchart illustrating a method for providing contextual ink functionality in a mapping interface.
Figure 3:
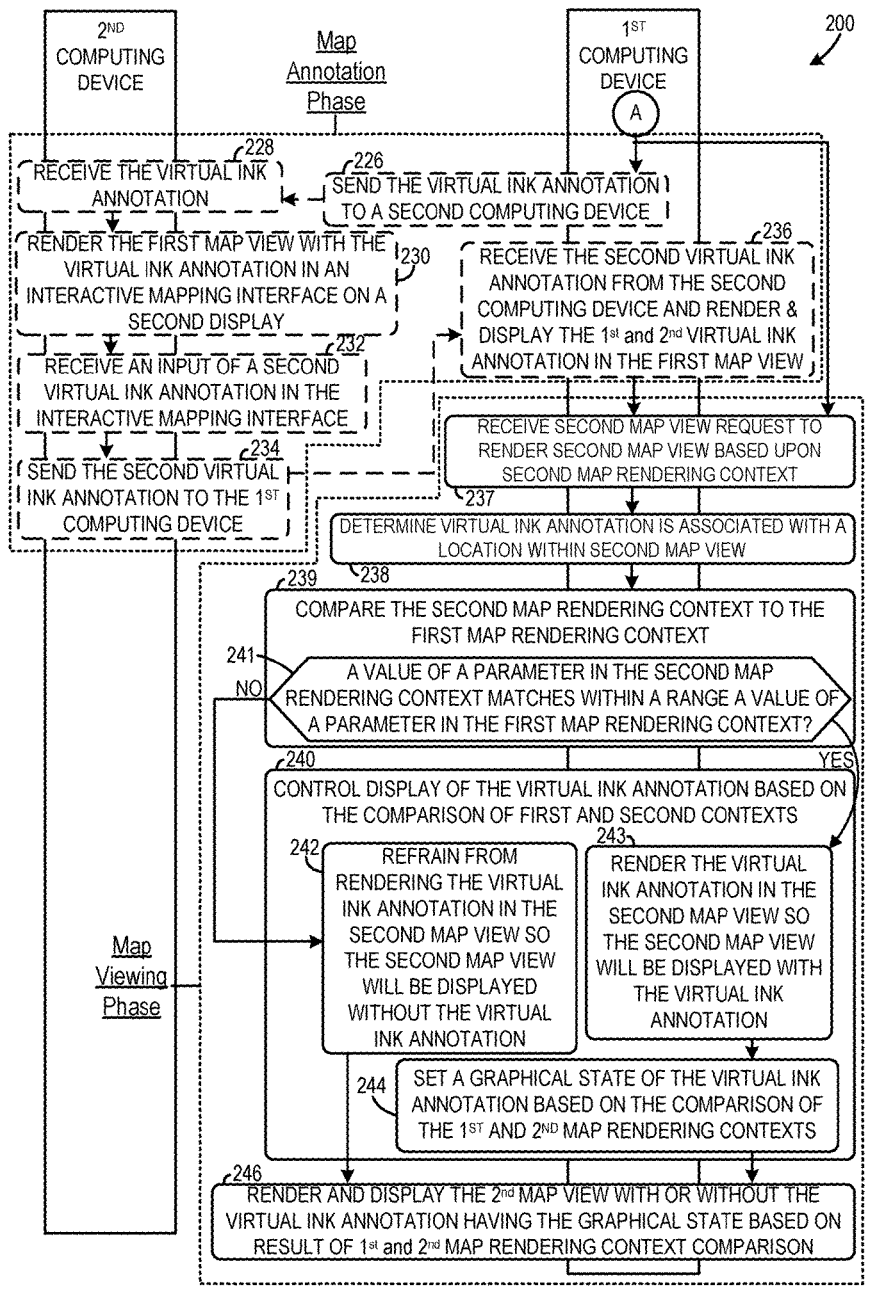
FIG. 3 is a continuation of the flowchart of FIG. 2.

FIGS. 2-3 show a method 200 for operation of a computing system. Method 200 may be carried out by the computing system discussed above with regard to FIG. 1, or may be implemented by another suitable computing system. The method steps are implemented in different phases. In particular, steps 201-236 are implemented during a map annotation phase where a user marks-up the interactive mapping interface with virtual ink annotations and steps 237-246 are implemented during a subsequent map viewing phase during which the same or a different user views a map view of the map data, and whether and how the virtual ink annotations are displayed are determined based on the map rendering context that existed when the virtual ink annotation were created.

At 201, the method includes receiving a first map view request to render a first map view of stored map data based on a first map rendering context. The map view request may be generated in response to user interaction with the map program. For instance, a user may enter a location into the map program, enter start and end points into a navigation module, select a predetermined map view, etc. At 202, the method includes, at the first computing device, requesting map data from a server. Next, at 204, the method includes, at the server, receiving the map data request. Next, at 206, the method includes, at the server, sending the requested map data to the first computing device in response to receiving the map data request. It will be appreciated that the requested map data may be retrieved in a map database in the server prior to sending the requested map data.

At 208, the method includes, at the first computing device, receiving the requested map data from the server. Next, at 210, the method includes rendering the first map view of the stored map data based upon the first map rendering context. As discussed above, a parameter in the first map rendering context may specify a zoom level, a central geographical location, map type, an emphasized object or set of emphasized objects, navigation mute, or navigation marker according to which the map view is rendered.

Next, at 212, the method includes displaying the first map view in an interactive mapping interface on a display. Next, at 214, the method includes receiving an input of a virtual ink annotation on the rendered map view of the interactive mapping interface. The input of virtual ink annotation may be generated in response to stylus or touch interaction with a touch screen, touch tablet, etc. However, other suitable input devices may be used for ink input such as a mouse, trackpad, etc. Next, at 216, the method includes associating the first map rendering context with the virtual ink annotation. Next, at 218, the method includes storing the virtual ink annotation and at least a portion of the first map rendering context in stored map data.

Next, at 220, the method includes, at the first computing device, sending the virtual ink annotation and first map context to the server. At 222, the method includes, at the server, receiving the virtual ink annotation. At 224, the method includes, at the server, storing the virtual ink annotation and first map rendering context in a map database. In another example, the virtual ink annotations may be directly sent to the server and not stored locally on the first computing device.

Turning to FIG. 3, steps 226 to 236 illustrate an optional process for enabling a second participant to add a second virtual ink annotation, which depending on context may be displayed concurrently with the virtual ink annotation added in FIG. 2 (hereinafter referred to in some instances as a "first" virtual ink annotation) in the first map view. Accordingly, at 226, the method may include, at the first computing device, sending the virtual ink annotation to a second computing device. This may be accomplished, for example by a user of the first computing device sharing a link (i.e., URL) to a first map view containing the virtual ink annotation to a second user via an email, text, or social network message for example. The link may contain a server address of the map server and an identifier for the first map view by which the server may identify and serve the requested map view. By selecting the link, a user at the second computing device may cause the first map view with the first virtual ink annotation to be downloaded. In this manner, at 228 the method may include, at the second computing device, receiving the virtual ink annotation. Further, at 230, the method may include rendering the first map view with the first virtual ink annotation in an interactive mapping interface on a second display.

At 232, the method may include, at the second computing device, receiving an input of a second virtual ink annotation in the interactive mapping interface. While this second virtual ink annotation may be added to a different map view (e.g., a different map view from a different point of view or at a different zoom level for example) than the first map view depending on a user's preference, for the purposes of explanation the method will be described as adding the second virtual ink annotation to the same first map view as the first virtual ink annotation. At 234, the method may include sending the second virtual ink annotation to the first computing device. This may be accomplished similarly to step 226, by, for example, sending a link to the first map view at the server via a message such as an email, text, or social network message transmitted from the user at the second computing device to the user at the first computing device. The user at the first computing device may click on the link to display the first map view (or different map view as the case may be), which includes the first and second virtual ink annotations. In this manner, at 236, the method may include receiving the second virtual ink annotation from the second computing device and rendering and displaying the second virtual ink annotation in the first map view along with the first virtual ink annotation. If desired, the user at the first computing device may repeat the process and add a third virtual ink annotation to the first map view, and share it again with the user of the second computing device. In this way, steps 228-236 enable users to share ink annotations across computing devices, facilitating collaborative inking scenarios. It will be appreciated that the first and second virtual ink annotations both will be displayed based on their shared map rendering context (i.e., the first map rendering context) since they were both authored in the same map view, and thus in the example at step 236 both the first and second virtual ink annotations are displayed in the first map view. In other examples, the second virtual ink annotation may be entered in a different map view with a different map rendering context, and thus the first and second virtual ink annotations may be displayed each according to its own context, based on the contextual controls for displaying the virtual ink annotations described in more detail below.

Steps 237-246 illustrate a map viewing phase in which a second map view is viewed, which is different from the first map view, and in which decisions of whether and how to display a virtual ink annotation (e.g., the first or second virtual ink annotations discussed above) are made based upon the map rendering context in which the virtual ink annotation was authored in the map annotation phase described above. While only one virtual ink annotation is discussed in steps 237-246 for the sake of brevity, it will be appreciated that the processes described in these steps may be independently performed for each of the virtual ink annotations present in the map data. Further, while steps 237-246 are described as occurring at the first computing device, these steps could occur at any computing device, such as the second computing device, or a third computing device used by a third user.

At 237, the method includes receiving a second map view request to render a second map view based upon a second map rendering context. The request to render the second map view may be generated in response to user interaction with the map program (e.g., interactive mapping interface). In one scenario, this second map view may be generated by navigating away from the first map view. For instance, a user may change the zoom level (e.g., zoom in/out) of the interactive mapping interface, change the central location of the interactive mapping interface (i.e., the geographic location on which the map display in the interactive mapping interface is centered), change the map type displayed in the interactive mapping interface, etc. In another scenario, the second map view may be generated not by navigating away from the first map view, but in another manner, such as entering a new map search or navigation command (e.g., keyword search, geographic coordinate search, pan/zoom command, etc.,) into the interactive mapping interface.

At 238, the method includes determining whether the virtual ink annotation is associated with a location within a second map view. This may be accomplished by first determining the central geographic location on which the second map view is centered (or other reference point by which the map view location is determined), then determining, by referencing zoom level, map display window size, etc., the geographic extent of the perimeter of the second map view, and then determining whether a location of the virtual ink annotation is within the map perimeter. At 239, the method includes comparing the second map rendering context to the first map rendering context, which will be discussed in further detail below. Following this comparison, at 240, the method includes controlling display of the virtual ink annotation based on the comparison of first and second contexts. Steps 239 and 240 may include a number ancillary steps, such as steps 241-244. Specifically, step 239 may include step 241 and step 240 may include steps 242-244.

Figure 11:
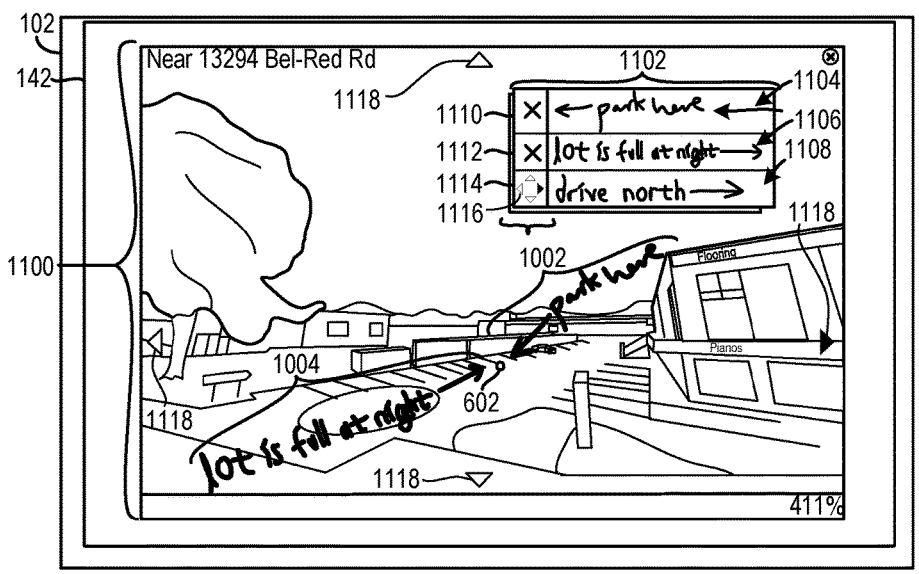
FIG. 11 is an illustration of the mapping interface of FIG. 10, depicting a map view taken from a street view, in which an ink annotation controller is provided to enable a user to select virtual ink annotations that are displayed in the map view.

At 241, as one possible way of accomplishing the comparison of map rendering contexts at 239, the method may include determining whether a value of a parameter of the second map rendering context matches within a range a value of a corresponding parameter of the first map rendering context. Display of the virtual ink annotation may be triggered if the value is within the range, and display may be inhibited if a match does not occur, as described below. In some cases, the system may be configured to provide the user an indication of virtual ink annotations that are nearby but out of the displayed field of view of the map. The nearby virtual ink annotations are said to be included in an extended range slightly larger than a viewable range defining the boundary of the displayed field of view. Therefore, in one example determining if the values match within a range may include determining if the values match within a viewable range and an extended range. In such a case, matching the value within the extended range as described here causes the virtual ink annotation to be marked as a candidate for display (i.e., displayable) such that when the field of view is adjusted to include the virtual ink annotation it is displayed. Displayable candidates that are nearby but not within the field of view of the map (i.e., that are within the extended range but not within the viewable range) are indicated as shown in FIG. 11 at 1118, described in more detail below.

In one example, the parameters in the first map rendering context and second map rendering context in step 241 may be selected pairs from the group consisting of a first central geographical location and a second central geographical location, a first map type and a second map type, a first emphasized object set and a second emphasized object set, a first navigation route and a second navigation route, and a first navigation marker and a second navigation marker. Additionally, it will be appreciated that the parameter may have a numerical value or a non-numerical value. As discussed above, in the case of a numerical value, the range may be a predetermined permissible deviation from a target value of the parameter of the first rendering context, such as ±2, ±5, ±10, etc. Zoom level is one example of a parameter than can be expressed with such a numerical value. However, in the case of a non-numerical value, such as a string identifier, the range may be a predetermined set of string identifiers, such as a set including the strings "satellite map" and "terrain map" from among a larger set of possible string values, as one specific example. In such an example, the string identifiers are matched if they are included in the predetermined set of string identifiers.

If the value of the parameter of the second map rendering context does not match within a range the value of the parameter of the first map rendering context (NO at 241) the method advances to 242. At 242, the method includes refraining from rendering the virtual ink annotation in the second map view so the second map view will be displayed without the virtual ink annotation. In this way, the virtual ink annotation is only presented when the first map rendering context of the first view in which it was created in the map annotation phase matches the subsequent second map rendering context of the second view during the map viewing phase. As a result, only relevant ink annotations are displayed in the interactive mapping interface and extraneous presentation of non-contextual virtual ink annotations is avoided. Thus, virtual ink annotations that are only relevant to a particular zoom level or range or levels are not shown at other zoom levels, etc., which declutters the map view and improves the viewing experience.

However, if the value of the parameter of the second map rendering context matches within a range the value of the parameter of the first map rendering context (YES at 241) the method advances to 243. At 243, the method includes rendering the virtual ink annotation in the second map view so the second map view will be displayed with the virtual ink annotation. Next, at 244, the method includes setting a graphical state of the virtual ink annotation based on the comparison of the first and second map rendering contexts. The graphical state may be an opacity, size, and/or angular orientation, as some examples. When the graphical state is an opacity or size, the opacity or size may be increased or decreased based on the matching of the parameter values.

For instance, the opacity and size may be rendered at full scale within a narrower predetermined range, and may be made transparent and smaller within a region of a broader range of display for zoom values above the narrower range and more transparent and larger for zoom values in a region of the broader range below the range when zooming in. In this manner, the likelihood of the virtual ink annotation obstructing underlying content can be decreased. One specific example of such a configuration is illustrated in FIG. 9, which will now be described before returning to FIG. 3.

Figure 9:
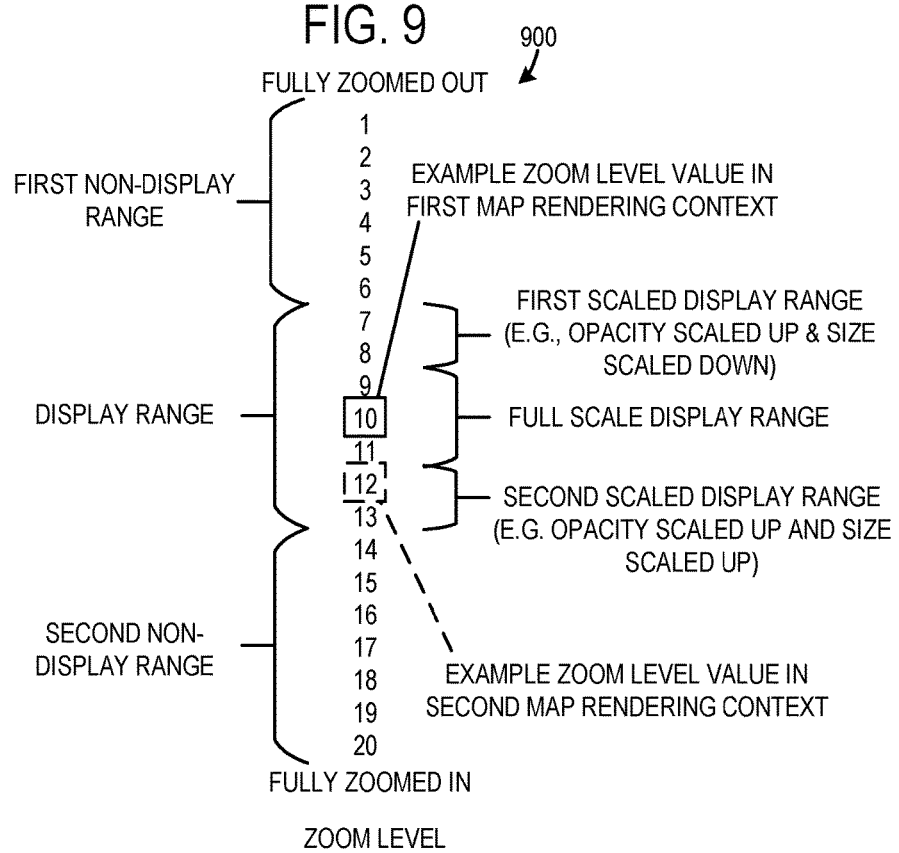
FIG. 9 shows a depiction of a zoom level gauge with different zoom level ranges that affect presentation and scaling of a virtual ink annotation.

FIG. 9 depicts an exemplary zoom level gauge 900 with example zoom level values in the first and second map rendering contexts that may be used to render the first and second map view. Zoom level gauge 900 schematically represents one possible zoom control algorithm that may be used to accomplish the control of the display of virtual ink at 240. Several zoom level ranges (i.e., first and second non-display ranges, display range, first and second scaled display ranges, and full scale display range) are indicated on the gauge 900. These ranges affect both presentation (i.e., display/non-display) and scaling (i.e., size retention or increase/decrease, as well as opacity scaling) of a virtual ink annotation presented in a first and second map view.

The ranges may be established based on desired variances between zoom level values of the first and second map rendering contexts, the variances being associated with different graphical states of the virtual ink annotation. As shown, the first scaled display range, full scale display range, and second scaled display range are contained within a larger display range. Thus, a wider range can affect the presentation state of the virtual ink annotation, while a narrower range within the wider range can affect the size scaling and opacity scaling (i.e., fade in and fade out) of the virtual ink annotation. Nesting ranges in this way enables a virtual ink annotation to be displayed in a larger group of map rendering contexts while other graphical states (e.g., scaling, opacity, etc.) can be finely tuned for a smaller group of map rendering contexts based on more granular ranges.

In the illustrated zoom level gauge 900, the first map rendering context has an example zoom level of 10 that is used to render the first map view. Additionally, the second map rendering context has an example zoom level of 12 that is used to render the second map view. The difference in the zoom levels in the first and second map rendering contexts may be brought about by user adjustment to map parameters or programmatically initiated. As shown, the zoom level 12 corresponding to the second map rendering context of the second view is positioned within the display range having an upper limit of 13 and a lower limit of 7. Therefore, in the depicted example a virtual ink annotation may be displayed in the second map view. However, if the second map rendering context had a zoom level value within the first non-display range or the second non-display range, the second map rendering context will prevent the virtual ink annotation from being rendered and displayed in the second map view.

Additionally in FIG. 9, the zoom level 12 corresponding to the second map rendering context of the second view is contained within the second scaled display range (i.e., 12-13). Consequently, the virtual ink annotation may be rendered in the second view having a scaled size and a scaled opacity. For instance, since the zoom level is increased the scale of the size virtual ink annotation may be correspondingly increased, while the scale of the opacity may be decreased in the second scaled display range. However, the scale of the size and the scale of the opacity of the virtual ink annotation both may be decreased when the zoom level value of the second map rendering context is decreased to be within the second scaled display range.

If the second map rendering context has a zoom level value within the full scale display range (i.e., 9-11) the second map rendering context will permit full scale rendering of the virtual ink annotation in the second view. In this way, small scale adjustments in zoom level may not affect virtual ink annotation scaling. The limits of the zoom ranges and selected zoom level values are exemplary in nature and numerous suitable zoom ranges and selected zoom level values have been contemplated.

Returning to FIG. 3 and generally building on the exemplary range gauge illustrated in FIG. 9, comparing the second map rendering context to the first map rendering context at step 239 may include other steps where parameter values are compared, subsequent to step 241. This step may include determining whether the value of the parameter in the second map rendering context is within a second range that is narrower than and contained within the first range of the value of the corresponding parameter in the first map rendering context. For instance, the first range may be the display range and the second range may be the full scale display range, shown in FIG. 9. However, a multitude of range combinations have been contemplated such as a display range and a full opacity range, a display range and an initial orientation range, etc.

If the value of the parameter in the second map rendering context is within the second range, the method includes setting a graphical state of the virtual ink annotation to be scaled in size and/or opacity according to a scale factor. The scale factor may be determined based on a difference between the parameter in the second map rendering context and the corresponding parameter in the first map rendering context. The scaling of the graphical state may directly correspond to adjustment of the parameter value. As such an increase/decrease in a parameter value may prompt an increase/decrease in the graphical aspect (e.g., opacity, size) of the virtual ink annotation. However, if the value of the parameter in the second map rendering context is not within the second range the method may advance to step 243.

At 246, the method includes rendering and displaying the second map view with or without the virtual ink annotation having the graphical state based on the result of first and second map rendering context comparison. For instance, the virtual ink annotation may be displayed in the second map view when the values of the parameters in the first and second map rendering contexts match within the range, as discussed above. On the other hand, the virtual ink annotation may not be displayed in the second may view when the values of the parameters in the first and second map rendering contexts do not match within the range. It will be appreciated that although the description above refers to a "first" map rendering context associated from the map annotation phase, and a "second" map rendering context in a map viewing phase, if the embodiment above is viewed from the point of view of the map viewing phase, different nomenclature may be used to refer to these rendering contexts. For example, in the map viewing phase, a map view request (akin to the second map view request) may be received to render a map view (akin to the second map view) of map data based upon a current map rendering context (akin to the second map rendering context). Further, it may be determined that a previously created virtual ink annotation (akin to the first virtual ink annotation) is associated with a location within the map view, the virtual ink annotation having a previous map rendering context (akin to the first map rendering context) captured at a time of creation of the virtual ink annotation. The current map rendering context may be compared to the previous map rendering context associated with the virtual ink annotation, and, based on a result of the comparison, display of the virtual ink annotation in a rendered map view may be controlled.

Figure 4:
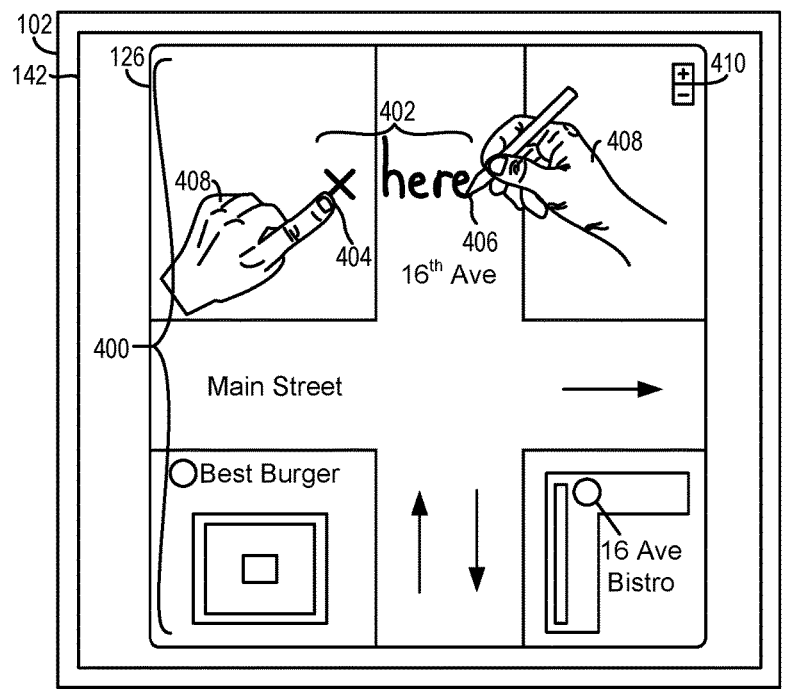
FIG. 4 is an illustration of a mapping interface displayed on a display of the computing system of FIG. 1, depicting a map view of a geographic location at a first zoom level at which a virtual ink annotation is displayed.
Figure 5:
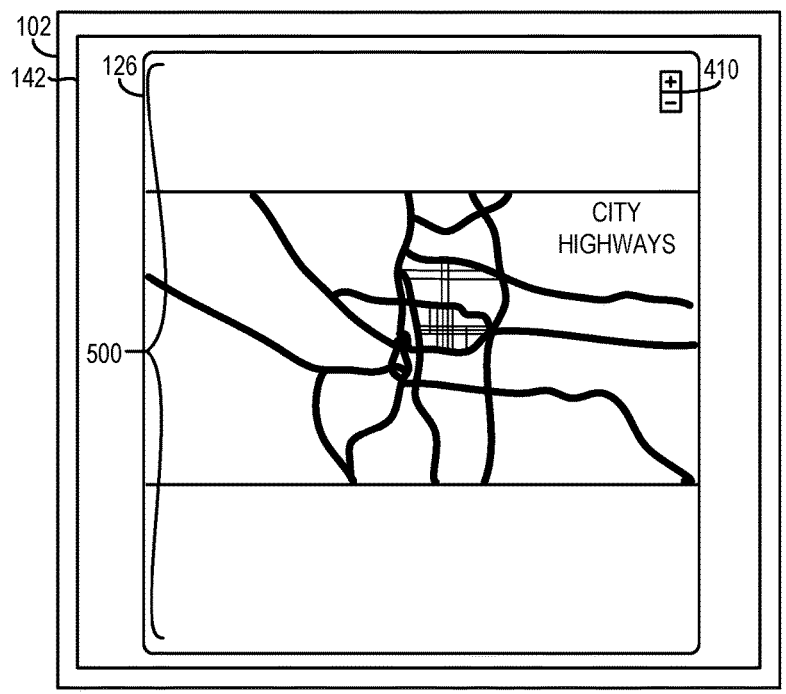
FIG. 5 is an illustration of the a mapping interface of FIG. 4, depicting a map view of a geographic location at a second zoom level at which a virtual ink annotation is not displayed.

FIG. 4 depicts the first computing device 102 with the display 142 presenting a map view 400 of map data in the interactive mapping interface 126 during a map annotation phase where a virtual ink annotation 402 is generated and FIG. 5 depicts the computing device 102 and display 142 presenting a map view 500 of map data in the interactive mapping interface 126 during a map viewing phase where the computing system refrains from displaying the virtual ink annotation. As discussed above, the map data can include data related to different geographical features (e.g., streets, businesses, restaurants, landforms, etc.) backgrounds, boundaries, templates, etc.

In FIG. 4, the map view 400 is rendered based upon a first map rendering context. In FIG. 4, the first map rendering context includes a numerical zoom level parameter defining a first viewable geographical region boundary. A virtual ink annotation 402 in the map view 400 is also shown. The virtual ink annotation 402 is generated based on a touch input 404 and stylus input 406 carried out by a user 408. Additionally, the virtual ink annotation 402 is associated with the first map rendering context used to render the map view 400. A zoom controller 410 is also provided in the map view 400. The zoom controller 410 enables a user to trigger map zooming operation (i.e., zooming in/zooming out.) In the depicted example, the user may interact with the zoom controller 410 to zoom out to the zoom level of the map view 500, shown in FIG. 5.

FIG. 5 shows a map view 500 during the map viewing phase, the map view during the map viewing phase is rendered based on a second map rendering context different from the first map rendering context associated with FIG. 4. Specifically in FIG. 5, the value of the zoom level of the map view 500 has been decreased. Thus, the map view 500 is zoomed out to a viewable boundary encompassing highways in a city as opposed to the map boundary encompassing the single street intersection shown in FIG. 4. As previously discussed, the map view may be zoomed out in response to user interaction with the zoom controller 410. The computing device 102 determines whether the zoom level value of the first map rendering context used to render the map view 400 shown in FIG. 4 matches within a range the zoom level value of the second map rendering context used to render the map view 500 shown in FIG. 5. The matching range is a range of numerical values. In this example, the range is set to ±2 from a first zoom level value of 8 and the zoom level value of the second map rendering context is 3, and therefore the zoom level values do not match within the range. Accordingly, the virtual ink annotation 402, shown in FIG. 4, is not rendered or displayed in the map view 500 shown in FIG. 5. In this way, extraneous presentation of virtual ink annotations unrelated to the current context of the interactive mapping interface can be avoided. In some alternate examples, a graphical state (e.g., size, opacity, and/or orientation) of the virtual ink annotation 402 may be altered based on a comparison of parameters in the different map rendering contexts.

Figure 6:
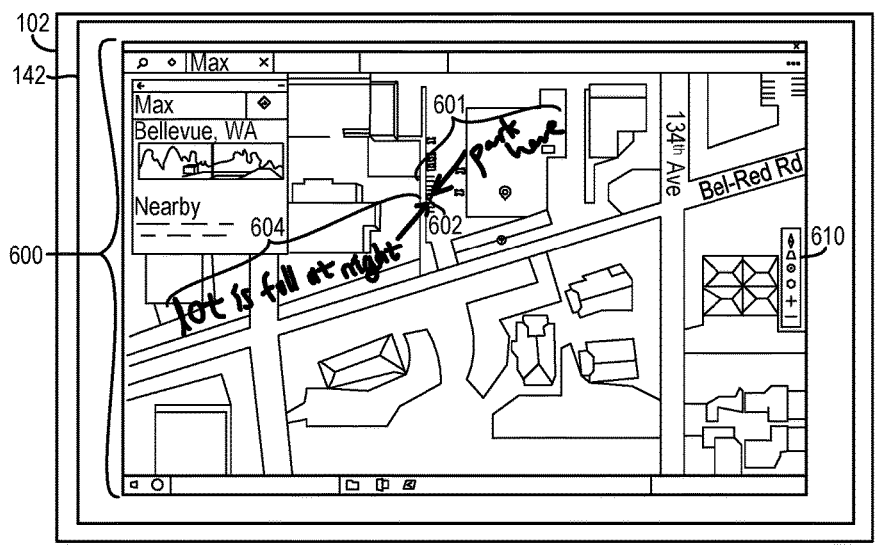
FIG. 6 is an illustration of a mapping interface of the computing system of FIG. 1, depicting a map view taken from an aerial view, in which a first and second virtual annotation from different users and different computing devices are displayed.
Figure 7:
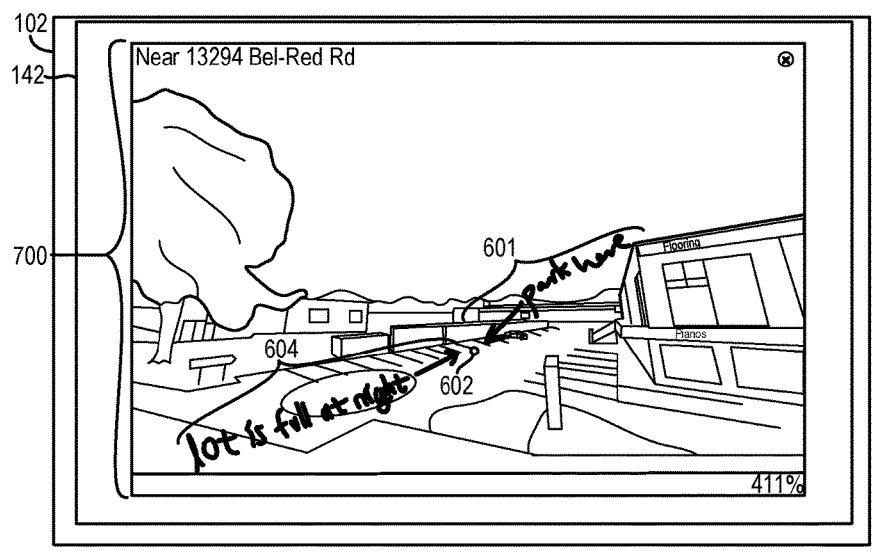
FIG. 7 is an illustration of the mapping interface FIG. 6, depicting a map view taken from a street view, in which the first and second virtual annotations from different users and different computing devices are displayed.

FIGS. 6-7 show a sequence of different map views on the display 142 rendered and displayed based on different map rendering contexts. The different map views in FIGS. 6-7 include similar emphasized objects. The first computing device 102 is also shown in FIGS. 6-7.

FIG. 6 shows a first map view 600 of the map data rendered based on an emphasized object 602. In this example, the emphasized object is a parking space. The value of emphasized object may be a location identifier such as geographical coordinates. A first virtual ink annotation 601 is presented in the first map view 600 is associated with the emphasized object 602. Specifically, the first virtual ink annotation 601 advises users to park in the indicated parking lot. A second virtual ink annotation 604 is also shown in FIG. 6. It will be appreciated that the second virtual ink annotation 604 may be sent to the display 142 from the second computing device 108, shown in FIG. 1. The second ink annotation 604 builds upon the information provided in the first virtual ink annotation 601 and indicates that the parking lot is commonly full at night. Rendering and displaying the virtual ink annotation 604 on the display 142 enables collaborative inking where multiple users can share notes, enhancing the map program's capabilities. Consequently, the map program may have greater applicability. A map controller 610 including buttons for adjusting the map's zoom level, map type, and other aspects of the map view 600 is also presented on the display.

FIG. 7 shows a second map view 700 of the map data rendered based on a second map rendering context. Parameters in the second map rendering context may be determined based on user interaction with the map controller 610. However, parameter adjustment through other input devices or programmatic techniques, can also be used to determine the parameters of the second map rendering context. The second map rendering context includes the emphasized object 602 presented in different map views. However, since the emphasized object 602 is presented in both the first map view 600 and the second map view 700 the values of the emphasized object match within a range. As such, the first virtual ink annotation 601 is presented in the second map view 700 without any change in visual appearance. Additionally, the second virtual ink annotation 604 is also shown in FIG. 7. In this way, ink annotations that are relevant across multiple map views can be correspondingly presented in each map view.

Figure 10:
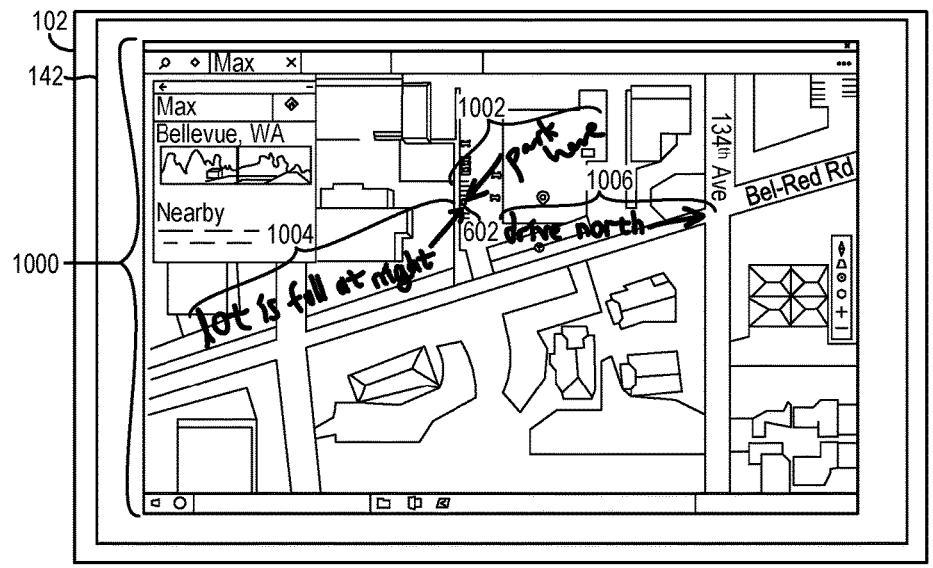
FIG. 10 is an illustration of a mapping interface of the computing system of FIG. 1, depicting a map view taken from an aerial view, in which first, second, and third virtual annotations are displayed.

FIGS. 10-11 show another sequence of different map views on the display 142 rendered and displayed based on different map rendering contexts with user selected virtual ink annotations. The first computing device 102 is also shown in FIGS. 10-11. The map views shown in FIGS. 10-11 are similar to the map views shown in FIGS. 6-7, except as explained in detail below.

FIG. 10 shows a first map view 1000 of the map data rendered based on an emphasized object 1002, illustrated as a parking lot. A first virtual ink annotation 1004, second virtual ink annotation 1006, and third virtual ink annotation 1008 are presented in the first map view 1000. Each of the annotations 1004, 1006, and 1008 are associated with the emphasized object 1002. It will be appreciated that the first, second, and third virtual ink annotations may be authored by different users, computing devices, etc., in the first map view, in one instance. However, in another example each annotation may be authored by a single user of the computing device 102.

FIG. 11 shows a second map view 1100 of the map data rendered based on a second map rendering context including different parameters from the first map rendering context used to render the first map view 1000 in FIG. 10. The parameters may be programmatically adjusted and/or adjusted by a user. In the second map view 1100 an ink annotation controller 1102 is provided. The ink annotation controller 1102 enables a user to view a list of the virtual ink annotations present within or nearby the second map view 1100. The ink annotation controller 1102 includes previews 1104, 1106, and 1108 of virtual ink annotations that were created and displayed in previous map views (e.g., the first map view 1000, shown in FIG. 10). Specifically, the previews 1104, 1106, and 1108 include respective depictions of the first, second, and third virtual ink annotations 1004, 1006, and 1008, shown in FIG. 10. The previews 1104, 1106, and 1108 corresponding to virtual ink annotations may only be presented in the ink annotation controller when a value of a parameter of the current map rendering context matches within a range a value of a parameter of the prior map rendering context in which the virtual ink annotation was created. Specifically in the depicted example, values of parameters associated with the virtual ink annotations 1004 and 1006 in the first map view 1000 are determined to each match within a viewable range corresponding values of parameters in the second map view 1100. As such, the indicators 1110 and 1112 corresponding to the first and second virtual ink annotations 1004 and 1006 are checked. The checked indicators signify that the first and second virtual ink annotations 1004 and 1006 are presented in the second map view 1100. It will be appreciated that the user may check and uncheck indicators 1104 and 1106 according to their predilection to control presentation (i.e., enable/disable rendering and display) of the virtual ink annotations 1004 and 1006 in the second map view 1100.

On the other hand, values of parameters associated the third virtual ink annotation 1006, illustrated in FIG. 10, are determined to match within an extended range values of parameters in the second map view 1100. The extended range encompasses parameters outside of the displayed field of view of the second map view 1100 in FIG. 11. Thus, the extended range corresponds to a field of view is slightly larger than the second map view 1100. Responsive to determining the values of the map parameters match within the extended range, a boundary adjustment tool 1118 is presented in the second map view 1100. Additionally, a preview 1116 of the boundary adjustment tool 1118 is presented in the indicator 1114. The boundary adjustment tool 1118 indicates the direction of the neighboring third virtual ink annotation 1006. In particular, the boundary adjustment tool 1118 includes a plurality of arrows. The arrow pointing in the direction of the third virtual ink annotation is highlighted or otherwise distinguished. As such, markers informing a user of locations of nearby virtual ink annotations and controls urging a user to adjust the viewable boundary to encompass the neighboring virtual ink annotations are provided. In this way, a user can be informed of relevant virtual ink annotations adjacent to the current map's field of view.

The ink annotations controller 1102 includes indicators 1110-1114. As depicted, the indicators 1110 and 1112 corresponding to the first and second virtual ink annotations 1004 and 1006 are checked. The checked indicators signify that the first and second virtual ink annotations 1004 and 1006 are presented in the second map view 1100. It will be appreciated that the user may check and uncheck indicators 1104 and 1106 according to their predilection to control presentation (i.e., enable/disable rendering and display) of the virtual ink annotations 1004 and 1006 in the second map view 1100, boundary adjustment toolboundary adjustment toolboundary adjustment toolboundary adjustment tool.

Several use-case examples are provided below to further describe the capabilities of the computing system and method described above with regard to FIGS. 1-7, 9, and 10-11. In one use-case example, the opacity and/or size of a virtual ink annotation presented in a map view may be increased and decreased responsive to zooming operation (i.e., zooming in and zooming out). For instance, when a map is zoomed out the opacity and/or size of a virtual ink annotation can be decreased. On the other hand, when the map is zoomed in the size and/or opacity of the virtual ink annotation can be increased. In this way, the likelihood of the virtual ink annotation blocking relevant map content can be reduced.

In another use-case example, the orientation of a virtual ink annotation in a map may be rotated when the map type is changed. For instance, a map may be changed from a satellite view to a street view. In such an example, the virtual ink annotation may be rotated in a direction such that it is not occluded by any objects in the street view and can be easily viewed by the user.

In another use-case example, a virtual ink annotation may only be presented in a map when a navigation marker is highlighted. For instance, the map program may provide a series of sequential navigation directions. When the current direction having an associated virtual ink annotation is highlighted presentation of the virtual ink annotation may be allowed. However, when a subsequent navigation direction is highlighted presentation of the virtual ink annotation may be suspended.

In another use-case example, a virtual ink annotation may correspond to a business (e.g., restaurant, clothing store, supermarket, etc.,) in a map of a selected city. When the business is no longer displayed in the map, presentation of the virtual ink annotation is suspended. The business may disappear from the map because the map view zoomed out beyond a threshold zoom level, the map is centered on another city, the map view is changed to a topographical map type, etc. In this way, ink annotation viewability can be directly tied to viewability of a business.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
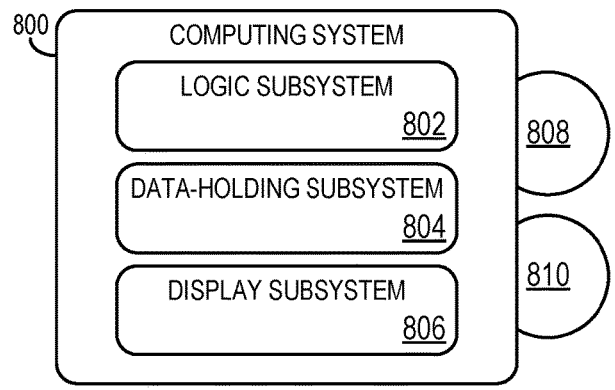
FIG. 8 shows a depiction of an exemplary computing device that may be used as any of the computing devices or servers in the computing system of FIG. 1.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic subsystem 802 and a data-holding subsystem 804. Computing system 800 may optionally include a display subsystem 806, input subsystem 808, communication subsystem 810, and/or other components not shown in FIG. 8.

Logic subsystem 802 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Data-holding subsystem 804 includes one or more physical devices configured to hold instructions executable by the logic subsystem to implement the methods and processes described herein. When such methods and processes are implemented, the state of data-holding subsystem 804 may be transformed—e.g., to hold different data.

Data-holding subsystem 804 may include removable and/or built-in devices. Data-holding subsystem 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data-holding subsystem 804 may include volatile, nonvolatile, dynamic, static, read/write, read-only, random-access, sequential-access, location-addressable, file-addressable, and/or content-addressable devices.

It will be appreciated that data-holding subsystem 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 802 and data-holding subsystem 804 may be integrated together into one or more hardware-logic components. Such hardware-logic components may include field-programmable gate arrays (FPGAs), program- and application-specific integrated circuits (PA-SIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic subsystem 802 executing instructions held by data-holding subsystem 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by data-holding subsystem 804. This visual representation may take the form of a graphical user interface (GUI). As the herein described methods and processes change the data held by the data-holding subsystem, and thus transform the state of the data-holding subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or data-holding subsystem 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The subject matter of the present disclosure is further described in the following paragraphs. According to one aspect, a method for operating a computing device including a processor and a display is provided. The method includes determining that a previously created virtual ink annotation is associated with a location within the map view, the virtual ink annotation having a previous map rendering context captured at a time of creation of the virtual ink annotation, comparing the current map rendering context to the previous map rendering context associated with the virtual ink annotation, and based on a result of the comparison, controlling display of the virtual ink annotation in a rendered map view.

In this aspect, to compare the current and previous map rendering contexts, the method may further include determining whether a value of a parameter in the current map rendering context matches within a range a value of a corresponding parameter in the previous map rendering context, and if so, rendering the virtual ink annotation in the map view and displaying the map view with the virtual ink annotation, and if not, then refraining from rendering the virtual ink annotation in the map view and displaying the map view without the virtual annotation.

In this aspect, the parameter in the current map rendering context may be a zoom level for the map view and the corresponding parameter in the previous map rendering context may be a zoom level at the time of creation of the virtual ink annotation.

In this aspect, display of the virtual ink input may also be controlled based on user selection of a preview of the virtual ink annotation presented in an ink annotation controller displayed in the rendered map view.

In this aspect, the method may further comprise setting a graphical state of the virtual ink annotation based on a result of the comparison of the current and previous map rendering contexts.

According to another aspect, a computing device is provided. The computing device includes a processor configured to, in a map annotation phase, receive a first map view request to render a first map view of stored map data based upon a first map rendering context, render the first map view based on the first map rendering context, display the first map view in an interactive mapping interface on a display, receive an input of a virtual ink annotation on the rendered map view in the interactive mapping interface, associate the first map rendering context with the virtual ink annotation, store the virtual ink annotation and the first map rendering context in the stored map data, in a subsequent map viewing phase, receive a second map view request to render a second map view of the stored map data based upon a second map rendering context, determine that the virtual ink annotation is associated with a location within the second map view, compare the second map rendering context to the first map rendering context, and based on a result of the comparison, control display of the virtual ink annotation in the second map view, render and display the second map view.

In this aspect, to compare the second and first map rendering contexts, the processor may be further configured to determine whether a value of a parameter in the second map rendering context matches within a range a value of a corresponding parameter in the first map rendering context, and if so, render the virtual ink annotation in the second map view and display the second map view with the virtual ink annotation; and if not, then refrain from rendering the virtual ink annotation in the second map view and display the second map view without the virtual annotation.

In this aspect, the parameter in the second map rendering context may be a zoom level for the second map view and the corresponding parameter in the first map rendering context may be a first zoom level for the first map view.

In this aspect, the values of the first and second zoom levels may be within in a zoom scale having a plurality of discrete zoom levels.

In this aspect, the processor may be further configured to set a graphical state of the virtual ink annotation based on a result of the comparison of the first and second map rendering contexts.

In this aspect, the range may be a first range, the processor may be further configured to determine whether the value of the parameter in the second map rendering context is within a second range that is narrower than and contained within the first range of the value of the corresponding parameter in the first map rendering context, and if so, set a graphical state of the virtual ink annotation to be scaled in size and/or opacity according to a scale factor that is based on a difference between the parameter in the second map rendering context and the corresponding parameter in the first map rendering context.

In this aspect, the parameters in the first map rendering context and second map rendering context may be selected pairs from the group consisting of a first central geographical location and a second central geographical location, a first map type and a second map type, a first emphasized object set and a second emphasized object set, a first navigation route and a second navigation route, and a first navigation marker and a second navigation marker.

In this aspect, the processor may be further configured to, during the map annotation phase, receive a second virtual ink annotation from a second computing device and render the second virtual ink annotation in the first map view.

According to another aspect, a method for operating a computing device including a processor and a display is provided. The method includes in a map annotation phase, receiving a first map view request to render a first map view of stored map data based upon a first map rendering context, rendering the first map view based on the first map rendering context, displaying the first map view in an interactive mapping interface on the display, receiving an input of a virtual ink annotation on the rendered map view in the interactive mapping interface, associating the first map rendering context with the virtual ink annotation, storing the virtual ink annotation and the first map rendering context in the stored map data, in a subsequent map viewing phase, receiving a second map view request to render a second map view of the stored map data based upon a second map rendering context, determining that the virtual ink annotation is associated with a location within the second map view, comparing the second map rendering context to the first map rendering context, and based on a result of the comparison, controlling display of the virtual ink annotation in a rendered second map view.

In this aspect, to compare the second and first map rendering contexts, the method may further include determining whether a value of a parameter in the second map rendering context matches within a range a value of a corresponding parameter in the first map rendering context, and if so, rendering the virtual ink annotation in the second map view and displaying the second map view with the virtual ink annotation, and if not, then refraining from rendering the virtual ink annotation in the second map view and displaying the second map view without the virtual annotation.

In this aspect, the parameter in the second map rendering context may be a zoom level for the second map view and the corresponding parameter in the first map rendering context may be a first zoom level for the first map view.

In this aspect, the values of the first and second zoom levels may be within in a zoom scale having a plurality of discrete zoom levels.

In this aspect, the method may further include setting a graphical state of the virtual ink annotation based on a result of the comparison of the first and second map rendering contexts.

In this aspect, the range may be a first range, the method may further include determining whether the value of the parameter in the second map rendering context within a second range that is narrower than and contained within the first range of the value of the corresponding parameter in the first map rendering context, and if so, set a graphical state of the virtual ink annotation to be scaled in size and/or opacity according to a scale factor that is based on a difference between the parameter in the second map rendering context and the corresponding parameter in the first map rendering context.

In this aspect, the parameter in the first map rendering context may be a first central geographical location and the parameter of the second map rendering context may include a second central geographical location.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for operating a computing device including a processor and a touchscreen display device comprising:
   receiving a map view request to render a map view of map data based upon a current map rendering context;
   determining that a previously created virtual ink annotation generated on a previous rendered map view beneath touch strokes of touch input in response to receiving the touch input at the touchscreen display device is associated with a location within the map view, the virtual ink annotation having a previous map rendering context captured at a time of creation of the virtual ink annotation, the previous map rendering context including a corresponding zoom level having an initial zoom level value when the virtual ink annotation is generated on the previous rendered map view;
   comparing the current map rendering context to the previous map rendering context associated with the virtual ink annotation to determine whether a subsequent zoom level value of the current map rendering context is within a predefined range containing the initial zoom level value, the predefined range being a subset of an available zoom range; and
   based on a result of the comparison, controlling display of the virtual ink annotation in a rendered map view by:
      if the subsequent zoom level value is within the predefined range, rendering the virtual ink annotation in the map view and displaying the map view with the virtual ink annotation; and
      if the subsequent zoom level value is not within the predefined range, then refraining from rendering the virtual ink annotation in the map view and displaying the map view without the virtual ink annotation.

2. The method of claim 1, where display of the virtual ink annotation is also controlled based on user selection of a preview of the virtual ink annotation presented in an ink annotation controller displayed in the rendered map view.

3. The method of claim 1, further comprising setting a graphical state of the virtual ink annotation based on the result of the comparison of the current and previous map rendering contexts.

4. The method of claim 1, wherein the predefined range is a first numerical range, the method further comprising determining whether the subsequent zoom level value of a zoom level of the current map rendering context is within a second numerical range that is narrower than and nested within the first numerical range of the corresponding zoom level having the initial zoom level value in the previous map rendering context, and if so, set a graphical state of the virtual ink annotation to be scaled in size and/or opacity according to a scale factor that is based on a difference of scale between the zoom level of the current map rendering context and the corresponding zoom level of the previous map rendering context.

5. A computing device comprising:
   a processor configured to:
      in a map annotation phase:

receive a first map view request to render a first map view of stored map data based upon a first map rendering context;
render the first map view based on the first map rendering context;
display the first map view in an interactive mapping interface on a touchscreen display device;
receive a touch input, via the touchscreen display device, on the rendered map view in the interactive mapping interface;
generate a virtual ink annotation on the rendered map view beneath touch strokes of the touch input in response to receiving the touch input;
associate the first map rendering context with the virtual ink annotation, the first map rendering context including a corresponding zoom level having an initial zoom level value when the virtual ink annotation is generated on the rendered map view;
store the virtual ink annotation and the first map rendering context in the stored map data;
in a subsequent map viewing phase:
receive a second map view request to render a second map view of the stored map data based upon a second map rendering context;
determine that the virtual ink annotation is associated with a location within the second map view;
compare the second map rendering context to the first map rendering context to determine whether a subsequent zoom level value of the second map rendering context is within a predefined range containing the initial zoom level value, the predefined range being a subset of an available zoom range;
based on a result of the comparison, control display of the virtual ink annotation in the second map view by:
if the subsequent zoom level value is within the predefined range, then render the virtual ink annotation in the second map view and display the second map view with the virtual ink annotation; and
if the subsequent zoom level value is not within the predefined range, then refrain from rendering the virtual ink annotation in the second map view and display the second map view without the virtual ink annotation.

6. The computing device of claim 5, where the initial zoom level and subsequent zoom level values are within a zoom scale having a plurality of discrete zoom levels.

7. The computing device of claim 5, wherein the processor is further configured to:
set a graphical state of the virtual ink annotation based on the result of the comparison of the first and second map rendering contexts.

8. The computing device of claim 5, wherein the predefined range is a first numerical range, the processor further being configured to determine whether the subsequent zoom level value of a zoom level of the second map rendering context is within a second numerical range that is narrower than and nested within the first numerical range of the corresponding zoom level having the initial zoom level value in the first map rendering context, and if so, set a graphical state of the virtual ink annotation to be scaled in size and/or opacity according to a scale factor that is based on a difference of scale between the zoom level of the second map rendering context and the corresponding zoom level of the first map rendering context.

9. The computing device of claim 5, where the corresponding zoom level of the first map rendering context having the initial zoom level value and a zoom level of the second map rendering context having the subsequent zoom level value are a respective pair of a plurality of parameters in the first map rendering context and the second map rendering context, and wherein the plurality of parameters for the first map rendering context and the second map rendering context further include one or more selected respective pairs from the group comprising:
a first central geographical location and a second central geographical location,
a first map type and a second map type,
a first emphasized object set and a second emphasized object set,
a first navigation route and a second navigation route, and
a first navigation marker and a second navigation marker.

10. The computing device of claim 5, where the processor is further configured to, during the map annotation phase, receive a second virtual ink annotation from a second computing device and render the second virtual ink annotation in the first map view.

11. A method for operating a computing device including a processor and a touchscreen display device comprising:
in a map annotation phase:
receiving a first map view request to render a first map view of stored map data based upon a first map rendering context;
rendering the first map view based on the first map rendering context;
displaying the first map view in an interactive mapping interface on the display;
receiving a touch input generating a virtual ink annotation on the rendered map view beneath touch strokes of the touch input at the touchscreen display device in the interactive mapping interface;
associating the first map rendering context with the virtual ink annotation, the first map rendering context including a corresponding zoom level having an initial zoom level value when the virtual ink annotation is generated on the rendered map view,
storing the virtual ink annotation and the first map rendering context in the stored map data;
in a subsequent map viewing phase:
receiving a second map view request to render a second map view of the stored map data based upon a second map rendering context;
determining that the virtual ink annotation is associated with a location within the second map view;
comparing the second map rendering context to the first map rendering context to determine whether a subsequent zoom level value of the second map rendering context is within a predefined range containing the initial zoom level value, the predefined range being a subset of an available zoom range; and
based on a result of the comparison, controlling display of the virtual ink annotation in a rendered second map view by:
if the subsequent zoom level value is within the predefined range, rendering the virtual ink annotation in the second map view and displaying the second map view with the virtual ink annotation; and
if the subsequent zoom level value is not within the predefined range, then refraining from rendering the virtual ink annotation in the second map view and displaying the second map view without the virtual ink annotation.

12. The method of claim 11, where the initial zoom level and subsequent zoom level values are within a zoom scale having a plurality of discrete zoom levels.

13. The method of claim 11, further comprising setting a graphical state of the virtual ink annotation based on the result of the comparison of the first and second map rendering contexts.

14. The method of claim 11, wherein the predefined range is a first numerical range, the method further comprising determining whether the subsequent zoom level value of a zoom level of the second map rendering context is within a second numerical range that is narrower than and nested within the first numerical range of the corresponding zoom level having the initial zoom level value in the first map rendering context, and if so, set a graphical state of the virtual ink annotation to be scaled in size and/or opacity according to a scale factor that is based on a difference of scale between the zoom level of the second map rendering context and the corresponding zoom level of the first map rendering context.

15. The method of claim 11, where the corresponding zoom level of the first map rendering context having the initial zoom level value and a zoom level of the second map rendering context having the subsequent zoom level value are a respective pair of parameters in the first map rendering context and the second map rendering context, wherein an additional pair of parameters further includes a first central geographical location in the first map rendering context and a second central geographical location in the second map rendering context.

* * * * *